L. P. Garner.
Coal Sieve.
No 3,568. Reissued Jul. 27, 1869.
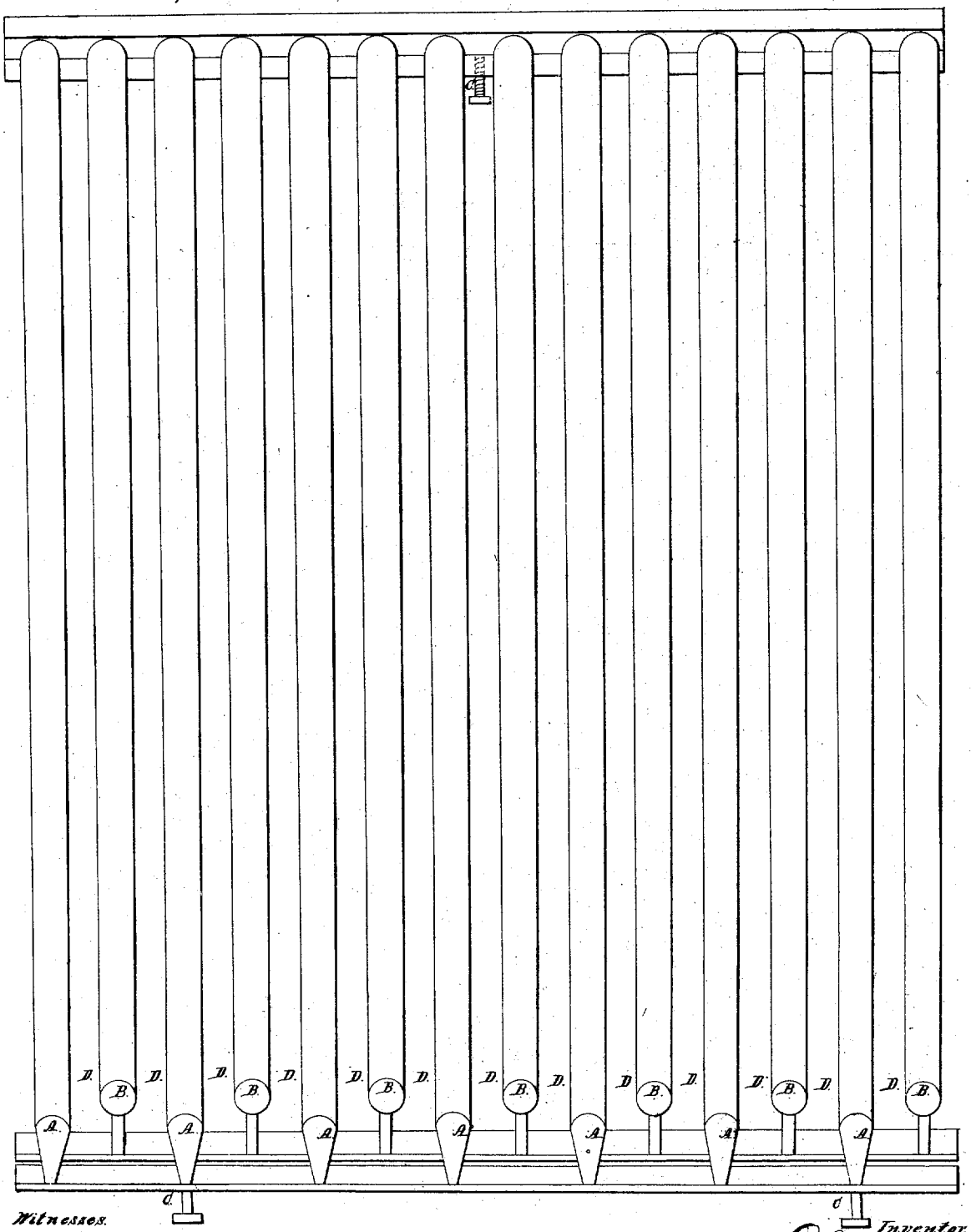
Witnesses.
A. P. Spinney
R. M. Rodgers
Inventor.
L. P. Garner
N. PETERS, PHOTO-LITHOGRAPHER, WASHINGTON, D. C.

United States Patent Office.

LEWIS P. GARNER, OF ASHLAND, PENNSYLVANIA.

*Letters Patent No.* 29,479, *dated August* 7, 1860; *reissue No.* 3,568. *dated July* 27, 1869.

IMPROVEMENT IN DEVICE FOR SEPARATING COAL FROM SLATE.

The Schedule referred to in these Letters Patent and making part of the same.

*To all whom it may concern:*

Be it known that I, LEWIS P. GARNER, of Ashland, in the county of Schuylkill, and State of Pennsylvania, have invented a new and improved Apparatus for Separating Coal from Slate; and I do hereby declare that the following is a full, clear, and exact description thereof, which will enable others skilled in the art to make and use the same, reference being had to the accompanying drawings, forming part of this specification.

My invention consists in the employment of grate-bars of peculiar form for coal-slating screens, the said form being practically adapted for tilting the slate, which is mostly in broad, flat pieces, edgewise to the spaces between the bars, whereby the separation is greatly facilitated.

My invention also consists in the employment of two screens, the one lying within the other, one of such screens being movable so as to be raised or depressed at the pleasure of the operator; such raising and depression having, by reason of the shape of the bars of the screens, the effect of widening or narrowing the spaces between the bars.

The bars B B represent, at the upper surface, oval or triangular shape, which I find well adapted for tilting the flat, thin pieces of slate, so as to present the edges thereof to the spaces between the bars, in a manner to pass the said thin pieces through the narrow spaces necessary for retaining the coal.

The said bars are preferably widest at about the centre vertically, below which they are preferably narrowed. They may also be in the form of a regular triangle, the widest part being at the base. The coal is passed for slating over the said grates in the longitudinal direction of the bars, the said movements being caused by a vibratory movement of the said grates or otherwise, as found best.

I may also apply this form of grate-bars to rotary screens, the bars being arranged either circumferentially or lengthwise of the cylindrical screens.

This construction of the bars materially increases the breadth of the spaces at the top, thereby readily tilting and passing off the broad pieces, which, with grates as ordinarily constructed, would lie flat on the top.

The arrangement of the secondary bars A below the top of the bars B, also further facilitates this operation, as shown in the accompanying drawings.

A A A, &c., represent the inside or movable screen.

B B B, &c., represent the outside or stationary screen.

C C C, screws to raise or depress the inside screen.

D D, spaces which are widened or narrowed by raising or depressing the movable screen to permit larger or smaller pieces of slate and other refuse matter to fall through.

Having thus described my invention,

I claim as new, and desire to secure by Letters Patent—

1. The improved mode of separating the thin, flat pieces of slate from coal by the use of grate-bars, arranged to contract the spaces from the top downward, substantially as specified.

2. The employment of the screen within the screen, movable, so that the inside screen may be raised or depressed, at the will of the operator, thus increasing or diminishing the width of the spaces or openings between the bars, by reason of the peculiar shape of the bars, so that larger or smaller pieces of slate and other impurities may be separated from the coal and other materials that may be passed over said screens.

L. P. GARNER.

Witnesses:
M. M. MOCK,
LEWIS HAUSE.